United States Patent
Delbaere et al.

(10) Patent No.: US 11,181,674 B2
(45) Date of Patent: Nov. 23, 2021

(54) METHOD FOR GENERATING ALIGNMENT ON TOP OF A LIQUID CRYSTAL POLYMER MATERIAL

(71) Applicant: ROLIC TECHNOLOGIES AG, Allschwil (CH)

(72) Inventors: Fabien Xavier Delbaere, Flaxlanden (FR); Richard Frantz, Village-Neuf (FR); Qian Tang, Oberwil (CH); Jean-Francois Eckert, Kientzville (FR); Patricia Scandiucci De Freitas, Basel (CH); Hubert Seiberle, Weil am Rhein (DE)

(73) Assignee: ROLIC TECHNOLOGIES AG, Allschwil (CH)

( * ) Notice: Subject to any disclaimer, the term of this patent is extended or adjusted under 35 U.S.C. 154(b) by 43 days.

(21) Appl. No.: 16/316,056

(22) PCT Filed: Jul. 20, 2017

(86) PCT No.: PCT/EP2017/068316
§ 371 (c)(1),
(2) Date: Jan. 8, 2019

(87) PCT Pub. No.: WO2018/019691
PCT Pub. Date: Feb. 1, 2018

(65) Prior Publication Data
US 2019/0162889 A1     May 30, 2019

(30) Foreign Application Priority Data

Jul. 29, 2016 (EP) .................................... 16182085
Jul. 3, 2017 (EP) .................................... 17179308

(51) Int. Cl.
*G02F 1/1333* (2006.01)
*G02B 5/30* (2006.01)
*G02F 1/1335* (2006.01)
*G02F 1/13363* (2006.01)
*G02B 5/32* (2006.01)

(52) U.S. Cl.
CPC ......... *G02B 5/3016* (2013.01); *G02B 5/3091* (2013.01); *G02F 1/13363* (2013.01); *G02F 1/133528* (2013.01); *G02B 5/3083* (2013.01); *G02B 5/32* (2013.01)

(58) Field of Classification Search
CPC .. G02B 5/3016; G02B 5/3091; G02B 5/3083; G02B 5/32; G02F 1/13363; G02F 1/133528; G02F 1/1333
See application file for complete search history.

(56) References Cited

U.S. PATENT DOCUMENTS

| 4,122,027 A | 10/1978 | Cole, Jr. et al. |
|---|---|---|
| 4,401,369 A | 8/1983 | Jones |
| 4,565,424 A | 1/1986 | Huffman et al. |
| 4,667,020 A | 5/1987 | Etzbach et al. |
| 5,389,285 A | 2/1995 | Shannon et al. |
| 5,539,074 A | 7/1996 | Herr et al. |
| 5,593,617 A | 1/1997 | Kelly et al. |
| 5,650,534 A | 7/1997 | Kelly et al. |
| 5,700,393 A | 12/1997 | Kelly |
| 5,851,424 A | 12/1998 | Kelly |
| 6,107,427 A | 8/2000 | Herr et al. |
| 6,201,087 B1 | 3/2001 | Herr et al. |
| 6,395,351 B1 | 5/2002 | Benecke et al. |
| 6,632,909 B2 | 10/2003 | Buchecker et al. |
| 6,646,703 B1 | 11/2003 | Seiberle et al. |
| 6,717,644 B2 | 4/2004 | Schadt et al. |
| 6,733,690 B1 | 5/2004 | Lukac et al. |
| 6,746,729 B1 | 6/2004 | Cherkaoui et al. |
| 7,364,671 B2 * | 4/2008 | Schadt ............... C09K 19/38 252/299.1 |
| 7,959,990 B2 | 6/2011 | Cherkaoui et al. |
| 8,054,411 B2 | 11/2011 | Bachels et al. |
| 8,173,749 B2 | 5/2012 | Bachels et al. |
| 9,097,938 B2 | 8/2015 | Eckert et al. |
| 2004/0164272 A1 | 8/2004 | Buchecker et al. |
| 2007/0134441 A1 | 6/2007 | Shutou |
| 2011/0065859 A1 | 3/2011 | Bury et al. |
| 2012/0316317 A1 | 12/2012 | Eckert et al. |
| 2013/0222721 A1 | 8/2013 | Kim et al. |
| 2016/0083655 A1 | 3/2016 | Pires et al. |
| 2016/0271894 A1 | 9/2016 | Tang et al. |
| 2019/0162889 A1 * | 5/2019 | Delbaere ............. G02B 5/3091 |

FOREIGN PATENT DOCUMENTS

| EP | 2 067 064 B1 | 6/2014 |
|---|---|---|
| JP | 2005-202313 A | 7/2005 |
| JP | 2013-543992 A | 12/2013 |
| JP | 2014-215360 A | 11/2014 |
| KR | 10-2015-0130801 A | 11/2015 |
| TW | 565729 B | 12/2003 |
| WO | 99/37735 A1 | 7/1999 |
| WO | 99/64924 A1 | 12/1999 |
| WO | 00/04110 A1 | 1/2000 |
| WO | 00/05189 A1 | 2/2000 |

(Continued)

OTHER PUBLICATIONS

Hubert Seiberle et al., "Volume photo-aligned retarders", IEICE transactions on electronics, Institute of electronics, Nov. 2007, pp. 2088-2093, vol. E90C, No. 11, Tokyo, JP.

(Continued)

*Primary Examiner* — Geraldina Visconti
(74) *Attorney, Agent, or Firm* — Sughrue Mion, PLLC

(57) ABSTRACT

The present invention relates to a method for manufacturing an optical element including a layer comprising anisotropic optical function and alignment capability. The layer is formed from a composition comprising polymerizable liquid crystals and one or more photo-orientable substances. Alignment on top of the layer is achieved by exposure to linearly polarized light.

10 Claims, 4 Drawing Sheets

(56) References Cited

FOREIGN PATENT DOCUMENTS

| WO | 00/07975 A1 | 2/2000 |
| WO | 00/48985 A1 | 8/2000 |
| WO | 03/027056 A1 | 4/2003 |
| WO | 2004/085547 A1 | 10/2004 |
| WO | 2005/054406 A1 | 6/2005 |
| WO | 2005/105932 A1 | 11/2005 |
| WO | 2012/085048 A1 | 6/2012 |
| WO | 2015/024810 A1 | 2/2015 |
| WO | 2015/177062 A1 | 11/2015 |
| WO | 2017/081056 A1 | 5/2017 |

OTHER PUBLICATIONS

International Search Report of PCT/EP2017/068316 dated Dec. 21, 2017 [PCT/ISA/210].
Written Opinion of PCT/EP2017/068316 dated Dec. 21, 2017 [PCT/ISA/237].

* cited by examiner

METHOD FOR GENERATING ALIGNMENT ON TOP OF A LIQUID CRYSTAL POLYMER MATERIAL

CROSS REFERENCE TO RELATED APPLICATIONS

This application is a National Stage of International Application No. PCT/EP2017/068316, filed Jul. 20, 2017, claiming priorities based on European Patent Application Nos. 16182085.7, filed Jul. 29, 2016 and 17179308.6, filed Jul. 3, 2017.

TECHNICAL FIELD

The invention relates to methods of generating alignment on the surface of a material comprising a liquid crystal polymer material as well as to layer structures manufactured using such methods.

BACKGROUND OF THE INVENTION

Since a couple of years, photo-alignment has been successfully introduced in large scale production of liquid crystal displays (LCD) and optical retarder films for various applications, such as 3D-converter films, also known as film patterned retarders, for passive 3D television and monitors.

Compared to conventional alignment of liquid crystals by brushed surfaces, the photo-alignment technique has many advantages, such as high reproducibility, alignment patterning and suitability for roll to roll manufacturing. In addition, photo-alignment can be applied on curved surfaces, such as lenses, since the light which generates the alignment in the photo-alignment layers can follow the surface modulation, which is not the case for most of the alternative alignment methods. In the state of the art photo-alignment technique thin layers of photo-alignment materials are applied to a substrate, such as a glass plate or a plastic foil.

In case of optical retarder films, liquid crystal monomers are applied on top of the photo-alignment layer. After the alignment information of the photo-alignment layer has been transferred to the liquid crystal monomers, the monomers are polymerized and/or cross-linked in order to solidify the liquid crystal material. Polymerized and/or crosslinked liquid crystal monomers are also known as liquid crystal polymers (LCP).

U.S. Pat. No. 6,717,644B2 discloses stacks of LCP layers which have individual optical axis directions. Each of the LCP layers is aligned by an alignment layer, such as a photo-alignment layer. Because of this, the total number of layers in a stack of LCP layers is at least twice the number of LCP layers. Stacking of LCP layers with individual optical axis directions can, for example, be used to generate interference color filters, such as Solc filters.

U.S. Pat. No. 7,364,671B2 discloses a composition comprising cross-linkable liquid crystals and a photo-orientable substance. Further, it discloses methods to generate orientation of the cross-linkable liquid crystals by photo-alignment of the photo-orientable substance comprised in the composition. Subsequently, the liquid crystals are cross-linked by exposure to UV-light. Accordingly, only one layer has to be coated as the use of the above composition does not require an additional alignment layer. Because of the oriented LCP in the layer, the surface exhibits alignment capabilities for liquid crystals. Accordingly, such layers can be used as alignment layers for example in LCDs and at the same time they provide optical retardance due to the aligned LCP in the layer. However, the direction which is transferred to an adjacent liquid crystal material is identical to the direction of the liquid crystal material at the surface of the layer made from the composition. Even if a second layer of the above composition would be applied on top of the first layer such that the substances in the second layer could be directly photo-aligned with a different polarization direction of the irradiating light, there would be aligning forces from the first layer which compete with the orientation induced by the irradiating light and which could hardly be annihilated. Applying an isotropic layer between the two layers, as suggested in the above mentioned U.S. Pat. No. 6,717,644B2 would decouple the alignment of the two liquid crystal composition layers, but would again add a layer, which is undesired.

In U.S. Pat. No. 8,054,411B2 a layer of a material composition as described above is applied to a surface with aligning capability. The liquid crystal molecules of the composition are aligned according to the alignment direction of the surface, in the same way as a normal liquid crystal material not comprising photo-alignment substances. Then photo-alignment is performed from the side opposite to the aligning surface with linearly polarized light having a polarization direction which is able to induce an alignment direction in the layer of the material composition which is different from the orientation direction of the aligning surface. Because the two different alignment forces induce different orientation directions in the liquid crystal material, and because the conditions are chosen to allow reorientation, the liquid crystal material in the layer starts to twist. Subsequently, the liquid crystal molecules in the layer are cross-linked by exposure to UV-light to solidify the twisted structure. The free surface of the cross-linked layer, which has been exposed to the linearly polarized light, can act as an aligning surface for a further liquid crystal layer, for example an LCP layer, in the same way as described above. However, the liquid crystal molecules in an additional layer would be aligned in the same direction as the liquid crystal molecules at the surface of the cross-linked layer of said material composition.

It would be desirable to have methods and materials which allow reducing the number of layers required to stack LCP layers such that the director (defined as a direction parallel to the average direction of the liquid crystal molecules) in one LCP layer does not influence the director in an adjacent LCP layer. The solution to such a task would decrease the complexity of the production of stacked LCP layers and at the same time would reduce production costs.

SUMMARY OF THE INVENTION

An object of the present invention is therefore to provide a method and related materials to simplify production of devices containing complex stacks of LCP layers. Another object of the invention is to provide devices which can be produced with the above methods and materials.

In the method according to the invention at least one LCP containing layer is formed from a composition comprising polymerizable liquid crystals and one or more photo-orientable substances. Any kind of alignment treatment may be used to orient the polymerizable liquid crystal material in a desired direction and/or configuration. Contrary to the methods known from the prior art described above, in which the orientation of the polymerizable liquid crystal in the composition is changed by exposure to aligning light, the method of the present invention avoids modifying the already established orientation of the liquid crystal material when exposed to aligning light. Hence, alignment is generated in the surface of the above layer by exposure to aligning light such that the alignment direction at least in one area of the surface is different from the orientation of the liquid crystal director of the liquid crystals just beneath the upper surface of the layer in the at least one area.

For a non-twisted liquid crystal layer, the orientation direction of the liquid crystal molecules does not change along the thickness direction of the layer. However, for a twisted liquid crystal layer, such as a cholesteric liquid crystal layer, the orientation direction varies along the thickness direction. The term "just beneath the surface" with regard to the position of liquid crystals in a layer shall refer to those liquid crystal molecules which are closest to the surface. Accordingly, "the orientation direction of the liquid crystals just beneath the surface" at a certain position shall refer to the average orientation of the liquid crystal molecules, which are closest to the surface at said position. The term "liquid crystal director" is synonymously used with the "average orientation of the liquid crystal molecules". For a layer comprising only liquid crystal molecules, the liquid crystal molecules closest to the surface are even within the surface of the layer. In this case, the orientation direction of the liquid crystals which are closest to the surface is identical with the orientation at or within the surface. The situation may be different for a composition comprising a non-liquid crystal material. In particular if the non-liquid crystal material is phase separated from the liquid crystal material and is mainly located at the surface of the layer, there may be no liquid crystal molecules in the surface of the layer. In this case, the liquid crystal molecules closest to the surface have some distance to the surface of the layer.

For the purpose of easier reading, the abbreviation PLCPO is used in the following to refer to a material containing polymerizable liquid crystals and a photo-orientable substance. Accordingly, a PLCPO layer is a layer made from a PLCPO material.

The alignment generated in the surface of a PLCPO layer by exposure to aligning light can be transferred to a slave material deposited on top of the PLCPO layer, such as liquid crystal materials. Surprisingly, the alignment generated by the aligning light dominates even over strong alignment forces due to the aligned liquid crystals in the PLCPO layer, which otherwise are itself strong enough to align liquid crystals as disclosed in U.S. Pat. No. 7,364,671B2, mentioned above.

Polymerization of the liquid crystal material in the PLCPO layer can, for example, be initiated by exposure to non-polarized actinic light prior to, simultaneously with or after the exposure to aligning light. Preferably, polymerization is initiated before exposure to aligning light. In that case, depending on the type of photo-orientable substance in the composition, care may be taken that the non-polarized light does not initiate substantial photo-reaction of the photo-orientable substances as otherwise the number of photo-sensitive moieties may not be sufficient to generate the orientation in the subsequent exposure to aligning light. For example, a PLCPO material may be designed such that the wavelength sensitivity of the polymerizable liquid crystal material and of the photo-orientable substances are different and hence the polymerization of the liquid crystal material can be initiated by light of a different wavelength than that required for the aligning light. Preferably, the PLCPO material comprises a photo-initiator.

On the other hand, the PLCPO material may be designed such that for a certain light spectrum of the aligning light a single exposure to aligning light simultaneously initiates polymerization of the liquid crystal material and generation of orientation of the photo-orientable substance. By proper selection of material and exposure parameters, it is possible to rapidly solidify the liquid crystal material in the already oriented and desired configuration before the aligning forces due to the photo-alignment reaction induced by the aligning light are strong enough to deform the liquid crystal configuration.

It is even possible to maintain the configuration of the polymerizable liquid crystals if the PLCPO layer is exposed to aligning before the liquid crystals are polymerized. In this case the viscosity of the PLCPO material should be high enough to avoid a reorientation or twist deformation of the liquid crystals. For this purpose it is helpful to keep the temperature of the PLCPO material from the time of exposure to aligning light until the liquid crystals are polymerized well below the clearing temperature.

A PLCPO material may contain a solvent. The solvent may be helpful for preparing and storing the composition as well as for proper adjustment of the viscosity for optimum printing and/or coating performance. Solvents are typically removed, for example by heating, after the PLCPO material has been deposited on a support. A PLCPO material without a solvent should have a liquid crystalline phase, preferably at about room temperature.

A PLCPO material may further comprise isotropic or anisotropic fluorescent and/or non-fluorescent dyes, dichroic dyes and/or chiral additives.

In the absence of dyes or chiral additives an oriented layer of a PLCPO material shows birefringence and acts as an optical retarder.

In a preferred embodiment, a PLCPO material comprises one or more dichroic dyes, which absorb light at least in one wavelength range in the visible spectrum of the light. An aligned layer of such a PLCPO material will then act as a linear polarizer.

In another preferred embodiment, a PLCPO material comprises one or more chiral additives. Chiral additives cause the liquid crystals to twist. In an oriented layer of a PLCPO material comprising a chiral additive a left or right handed twist deformation may be induced, wherein the twist angle depends on type and concentration of the chiral additive and on the layer thickness. For example, if a twist of 90° develops in such a layer, the liquid crystals just beneath the upper surface of the PLCPO layer are oriented at 90° with regard to the liquid crystals at the bottom of the layer. For higher concentration of chiral additives a cholesteric phase can be induced, which causes a partial reflection of light in a certain wavelength band. This effect occurs also if the helical axis within the layer is not uniformly aligned. Accordingly, this is an example, in which an alignment treatment before or after depositing the PLCPO layer is not required. If the helical axis is uniformly aligned along the thickness direction of the layer, then within the characteristic reflection band of the cholesteric configuration 50% of the light that is incident from the normal to the layer plane is reflected and is circularly polarized. Because of the short pitch in a cholesteric liquid crystal phase, the orientation of the liquid crystals at the upper surface of a layer can hardly be oriented in a uniform direction, as slight variations of the layer thickness cause a variation of the twist.

Within the context of the present invention the properties of a cholesteric layer shall be included in the meaning of optical anisotropic, as the reflected light is circularly polarized with a left or right handedness.

The relative terms "upper" and "lower" used in combination with a layer as well as the surface of a layer are defined with regard to the position of the support. Accordingly, the lower part of a layer is facing the support, whereas the upper side or the upper surface, respectively, is facing away from the support.

A PLCPO layer applied and treated according to the method of the invention, has an optical function which is determined by the liquid crystal material and its configuration as well as by the optional isotropic or anisotropic fluorescent and/or non-fluorescent dyes, dichroic dyes and/or chiral additives included in the PLCPO material. In addition to the optical function, such a PLCPO layer has an aligning surface for aligning slave materials, for example polymerizable or non-polymerizable liquid crystal materials. The advantage of such a PLCPO layer over the prior art is, that the alignment direction induced by the aligning light on the upper surface of the PLCPO layer is decoupled from any orientation of the liquid crystal material in the PLCPO layer.

Within the context of the present application the terms "polymerizable" and "polymerized" shall include the meaning of "cross-linkable" and "cross-linked", respectively. Likewise, "polymerization" shall include the meaning of "cross-linking".

In the context of the present application, a "photo-orientable substance" is a material in which anisotropic properties can be induced upon exposure to aligning light. In addition, the term "photo-oriented substance" is used to refer to a photo-orientable substance that has been aligned by exposure to aligning light. For the present invention the induced anisotropy must be such, that it provides alignment capability for a slave material, in particular for a liquid crystal material. The term "alignment direction" shall refer to the preferred direction that is induced in the slave material. For example, if the slave material is a liquid crystal material, the alignment direction is the direction in which the liquid crystal molecules would be aligned.

In the context of the present application, the term "aligning light" shall mean light, which can induce anisotropy in a photo-orientable substance and which is at least partially linearly or elliptically polarized and/or is incident to the surface of a photo-orientable substance from an oblique direction. Preferably, the aligning light is linearly polarized with a degree of polarization of more than 5:1. Wavelengths, intensity and energy of the aligning light are chosen depending on the photosensitivity of the photo-orientable substance. Typically, the wavelengths are in the UV-A, UV-B and/or UV-C range or in the visible range. Preferably, the aligning light comprises light of wavelengths less than 450 nm. More preferred is that the aligning light comprises light of wavelengths less than 420 nm.

If the aligning light is linearly polarized, the polarization plane of the aligning light shall mean the plane defined by the propagation direction and the polarization direction of the aligning light. In case the aligning light is elliptically polarized, the polarization plane shall mean the plane defined by the propagation direction of the light and by the major axis of the polarization ellipse.

The terms photo-alignment, photo-alignable and photo-aligned are used synonymously with the terms photo-orientation, photo-orientable and photo-oriented, respectively.

BRIEF DESCRIPTION OF THE DRAWINGS

The invention is further illustrated by the accompanying drawing figures. It is emphasized that the various features are not necessarily drawn to scale.

DETAILED DESCRIPTION OF THE INVENTION

Figure 1:
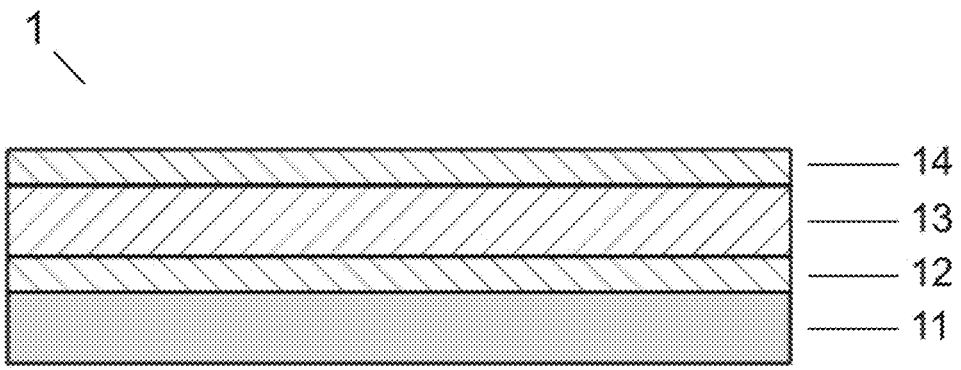
FIG. 1 depicts an example of a state of the art LCP stack, in which an LCP layer is sandwiched between two orientation layers.

According to a first aspect of the invention there is provided a method for manufacturing a stack of aligned LCP layers.

The method of the invention comprises the steps of
providing a composition comprising polymerizable liquid crystals and a photo-orientable substance (PLCPO material)
forming a layer of the PLCPO material on a support
optionally applying alignment treatment for the liquid crystal material of the PLCPO layer, if required
initiate polymerization of the polymerizable liquid crystals in the PLCPO layer
exposing the PLCPO layer to aligning light to generate alignment on the upper surface of the layer for a slave material, wherein the generated alignment direction at least in one area of the upper surface is different from the orientation of the liquid crystal director of the liquid crystals just beneath the upper surface of the layer in the at least one area.

The steps of polymerizing the polymerizable liquid crystals and exposure to aligning light may be in any sequence. Polymerization may be initiated before or after exposure to aligning light. In a special embodiment of the method, polymerization and generation of alignment is achieved in a single step of exposure to aligning light. In any case care has to be taken that the liquid crystals maintain their configuration during exposure to aligning light. Preferably, this is done by polymerizing the liquid crystals before exposing the PLCPO layer to aligning light.

If the PLCPO layer is exposed to aligning light before the liquid crystals are polymerized care has to be taken that the aligning light does not induce reorientation and twist deformation of the liquid crystals. For this purpose it is helpful to keep the temperature of the PLCPO material from the time of exposure to aligning light until the liquid crystals are polymerized well below the clearing temperature of the PLCPO material. Preferably, the temperature of the PLCPO material is less than 5° C. or 10° C. below the clearing temperature of the PLCPO material from the time of exposure to aligning light until the liquid crystals are polymerized. More preferred is that the temperature of the PLCPO material is less than 20° C., 30° C. or 40° C. below the clearing temperature, and most preferred the temperature of the PLCPO material is less than 50° C., 60° C. or 70° C. below the clearing temperature. Further preferred is that the temperature of the PLCPO material is close to room temperature. In particular preferred is that the temperature is less than 50° C. more preferred less than 40° C. and most preferred less than 30° C.

Preferably, a reorientation of the liquid crystals in the PLCPO layer by the action of the aligning light is prevented, which means that the orientation of the liquid crystals in the PLCPO layer is not changed by exposure to aligning light.

In a preferred embodiment of the method the aligning light is irradiated from an oblique direction to the surface of the PLCPO layer in order to generate a tilted alignment, for example to provide a pretilt angle for liquid crystals.

If the whole area of the PLCPO layer is exposed to aligning light, uniaxial alignment results. The aligning light may be shaped such that only part of the PLCPO layer is exposed to the aligning light, for example by covering certain areas by photo-masks or by scanning light beams to desired areas only. Subsequent exposure steps may be added with different polarization planes of the aligning light in order to generate an orientation pattern on the PLCPO layer. Any other method known to generate an alignment pattern by photo-alignment can be used as well, including exposure to aligning light with spatially modulated polarization plane. As a result, a plurality of orientation directions may be generated in the surface of the PLCPO layer. Preferred relative directions are 0°, 45°, 90°, 135°. Preferred combinations of directions in different areas are 0° and 45°, 0° and 90°, 45° and 135°.

Because without exposure to aligning light the liquid crystal material in the PLCPO layer provides alignment capabilities at the PLCPO surface, it is possible to generate an orientation pattern by selectively exposing certain areas to aligning light. After exposure, the alignment direction in the exposed areas is defined by exposure conditions such as the polarization plane of the aligning light and the exposure energy, whereas the aligning directions in the non-exposed areas are defined by the orientation direction of the polymerized liquid crystal material of the PLCPO layer. If the aligning light is irradiated from an oblique direction it is possible to generate a tilted orientation in the exposed areas, which is controlled by photo-alignment, whereas the non-exposed areas may have tilted or non-tilted alignment, controlled by the orientation of the polymerized liquid crystal material.

As mentioned above, the PLCPO layer already provides alignment capabilities before exposure to aligning light. Therefore, the aligning forces induced upon exposure to aligning light compete with the alignment forces provided by the oriented liquid crystals in the PLCPO layer. Accordingly, it is possible to adjust the balance between the two aligning forces by the exposure dose of the aligning light. This has the effect that the resulting alignment direction varies as a function of the exposure dose of the aligning light. In a preferred embodiment of the invention, the method comprises irradiating different zones of the PLCPO layer with aligning light with the same polarization plane but different energies. This could be done by several known methods such as multiple exposures using photomasks, single exposure through a grey scale mask, projection of spatially intensity modulated aligning light or scanning a light beam to the desired zones.

The support may be rigid or flexible and can have any form or shape. For example, it may be a body with complex surfaces. In principle it may consist of any material. Preferably, the support comprises plastic, glass or metal or is a silicon wafer. In case the support is flexible, it is preferred that the support is a plastic or metal foil. Preferably, the surface of the support is flat. For some applications the support may comprise topographical surface structures, such as microstructures like micro lenses or micro-prisms, or structures exhibiting abrupt changes of the shape, such as rectangular structures. Preferably, the support is transparent.

The support may be moving during the deposition of the PLCPO material. For example, a layer of the PLCPO material may be produced in a continuous roll to roll process by depositing the material composition onto a moving flexible foil, which is preferably plastic or metallic. The resulting film may then be wound on a roll together with the support foil or the film may be released from the support and is then wound as a free standing film, without the support.

The support may have additional layers, such as organic, dielectric or metallic layers. The layers can have different functions, for example an organic layer can be coated as a primer layer which increases compatibility of the materials to be coated with the support. Metallic layers may be used as electrodes, for example when used in electrooptical devices such as displays, or could have the function as a reflector. The support may also be an optical element or device which has certain functions, such as a substrate for an LCD, which might, for example, comprise thin film transistors, electrodes or color filters. In another example, the support is a device comprising an OLED layer structure. The support could also be a retarder film, a polarizer, such as a polarizing film or a sheet polarizer, a reflective polarizer, such as the commercially available Vikuity™ DBEF film.

The PLCPO layer may be applied to the support by any suitable method like, extruding, casting, molding, 2D- or 3D-printing or coating. Suitable coating methods are, for example: spin-coating, blade coating, knife coating, kiss roll coating, die coating, dipping, brushing, casting with a bar, roller-coating, flow-coating, wire-coating, spray-coating, dip-coating, curtain-coating, air knife coating, reverse roll coating, gravure coating, metering rod (Meyer bar) coating, slot die (Extrusion) coating, roller coating, flexo coating. Suitable printing methods include: silk screen printing, relief printing such as flexographic printing, jet printing, intaglio printing such as direct gravure printing or offset gravure printing, lithographic printing such as offset printing, or stencil printing such as screen printing.

A layer of a PLCPO material does not have to cover the full surface of a support. Rather than that, the layer may be applied in the form of a pattern, for example by printing, or may after deposition be treated to have the form of a pattern, for example by photo-lithographic methods.

Because the main purpose of the photo-orientable substance in a PLCPO layer is to generate alignment at the upper surface of a PLCPO layer, it is not required that the photo-orientable substance is equally distributed along the thickness direction of the layer. Therefore, the ratio of the amounts of photo-orientable substance to that of the other compound(s) preferably varies along the thickness direction of the layer, which means that there is a concentration gradient of the photo-orientable substance along the thickness direction. Preferably, the concentration of photo-orientable substance is higher at the upper surface of the PLCPO layer than in the middle of the layer. More preferred, the photo-orientable substance and the polymerizable liquid crystals are phase separated. Preferably, the phase separated photo-orientable substance is arranged as a layer above and/or below the polymerizable liquid crystals.

Alignment of the liquid crystals in the PLCPO layer can be achieved by any known means for aligning liquid crystals. For example, the support may have an aligning surface, which shall mean that the surface has the capability to align liquid crystals. The support may already provide the alignment without further treatment. For example, if a plastic substrate is used as a support, it may provide alignment on the surface due to the manufacturing method, for example extrusion or stretching of the substrate. It is also possible to brush the support or imprint a directional microstructure to generate alignment capability. Alternatively, a thin layer of a material may be coated on the support which is especially designed regarding alignment performance. The layer may be further brushed or treated to have a directional microstructure on the surface, for example by imprinting. If the thin layer comprises a photo-orientable substance, alignment can be generated by exposure to aligning light.

The aligning surface of the substrate may exhibit a pattern of alignment directions in order to define an orientation pattern for the liquid crystals in the PLCPO layer. Preferably, an alignment layer comprising a photo-orientable substance is used for this purpose and the alignment pattern is generated by selective exposure to aligning light of different polarization planes.

In a preferred embodiment of the invention, alignment of the liquid crystals in the PLCPO layer is generated by exposure to aligning light before polymerizing the polymerizable liquid crystals. This is possible, because the PLCPO material comprises a photo-orientable substance. Accordingly, this leads to a further reduction of layers required for manufacturing a stack of LCP layers, as no additional aligning layer is required for the alignment of the liquid crystals in the PLCPO layer. Similar to the case with the additional photo-alignment layer on the substrate, it is possible in this method to generate an orientation pattern for the liquid crystals in the PLCPO material. The aligning light may be irradiated onto the upper side of the PLCPO layer. In this case care may be taken that a sufficient amount of photo-sensitive moieties are left close to the upper surface of the PLCPO layer in order to have them available for the later photo-alignment reaction according to the method of the invention, required to provide alignment on the upper surface of the PLCPO layer. For example, two different photo-orientable substances may be included in the PLCPO material, which have different wavelength sensitivity and which can be selectively activated by using different aligning light each with a proper wavelength spectrum.

In a preferred embodiment, the support is at least partially transparent for the aligning light and the aligning light is irradiated onto to the lower side of the PLCPO layer through the support. For this purpose, the support is preferably a glass plate or a plastic substrate, such as a plastic film. Preferably, the substrate has a low optical birefringence. Preferably, the in plane optical retardance of the substrate is less than 100 nm. more preferred less than 50 nm and most preferred less than 20 nm.

In the above methods of aligning the liquid crystals inside the PLCPO layer by photo-orientation, it is helpful to support the liquid crystal orientation by increasing the temperature of the PLCPO material before, during or after exposure to aligning light, for example to temperatures just below or above the clearing temperature of the PLCPO material.

In any of the above methods for providing alignment for the liquid crystals in the PLCPO material it may be helpful to increase the temperature of a PLCPO layer after deposition of the PLCPO material.

In addition to any of the above variants, the method of the invention may comprise the step of applying a slave material on top of the aligned surface of the PLCPO layer.

In the context of the present application, a "slave material" shall refer to any material that has the capability to establish anisotropy upon contact with a photo-oriented material.

The terms "anisotropic" and "anisotropy" may, for example, refer to the optical absorption, the birefringence, the electrical conductivity, the molecular orientation, the property for alignment of other materials, for example for liquid crystals, or mechanical properties, such as the elasticity modulus. For example, if the slave material exhibits light absorption anisotropy for visible light it can act as a linear polarizer. The term "alignment direction" shall refer to the symmetry axis of the anisotropic property.

A slave material may comprise polymerizable and/or non-polymerizable compounds.

The slave material may be applied by coating and/or printing with or without solvent and may be applied over the full area of the PLCPO layer or only on parts of it. Preferably, the method involves heating the slave material before or after applying it to the PLCPO layer. The method may also comprise initiating polymerization in the slave material by thermal treatment or exposure to actinic light. Depending on the nature of the slave material, it may be helpful to perform the polymerization under inert atmosphere, such as nitrogen, or under vacuum. The slave material may contain isotropic or anisotropic dyes and/or fluorescent dyes.

Preferably, the slave material is a self-organizing material. More preferred is that the slave material is a liquid crystal material and in particular preferred is that the slave material is a liquid crystal polymer (LCP) material.

A liquid crystal polymer (LCP) material as used within the context of this application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material, for example due to contact with an aligning layer. Polymerization may be initiated by thermal treatment or by exposure to actinic light, which preferably comprises uv-light. A LCP-material may comprise only a single type of liquid crystal compound, but may also comprise additional polymerizable and/or non-polymerizable compounds, wherein not all of the compounds have to be liquid crystal compounds. Further, an LCP material may contain additives, including but not limited to a photo-initiator, an inhibitor, a chiral additive, isotropic or anisotropic fluorescent and/or non-fluorescent dyes, in particular dichroic dyes.

Suitable liquid crystal monomers or pre-polymers are for example disclosed in WO2005/105932, WO2005/054406, WO2004/085547, WO2003/027056, US2004/0164272, U.S. Pat. Nos. 6,746,729, 6,733,690, WO2000/48985, WO2000/07975, WO2000/04110, WO2000/05189, WO99/37735, U.S. Pat. Nos. 6,395,351, 5,700,393, 5,851,424 and 5,650,534. Preferred liquid crystal monomers or pre-polymers have polymerizable groups, which are acrylate or diacrylate, methacrylate, dimethacrylate, allyl, vinyl or acrylamide.

In another preferred embodiment, the slave material is a PLCPO material, forming a second PLCPO layer. The liquid crystals in this upper PLCPO layer are then aligned by the aligned surface of the lower PLCPO layer. Polymerization of the polymerizable liquid crystals and generation of alignment at the upper PLCPO layer surface by exposure to aligning light can be done in the same way, including the different variants of methods and materials as described above with regard to the lower PLCPO layer. Because alignment is generated in the upper surface of the second PLCPO layer, another layer of a slave material can be applied on top. Hence, the second layer of slave material does not need a separate alignment layer for the same reasons as described above. The same or different material compositions may be used for the first and second PLCPO layer. For example, the first PLCPO layer may comprise dichroic dyes and therefore acts as a linear polarizer and the second PLCPO layer may comprise a chiral additive and therefore acts as a cholesteric liquid crystal layer. In another example, the first layer acts as a retarder, whereas the second PLCPO layer comprises dichroic dyes and acts as a linear polarizer. The liquid crystals in either of the first and second PLCPO layer may be uniformly aligned or may have locally different orientation directions.

In the same way, a third PLCPO layer may be applied on top of the second PLCPO layer, which provides the alignment information for the third PLCPO layer. Further PLCPO layers may be applied in a similar way. There is no limitation in the number of PLCPO layers stacked on each other. Stacks requiring a high number of oriented liquid crystal layers have the highest benefit from the method of the invention, as without this method each of the slave material layers, such as LCP or PLCPO layers, stacked on top of the first PLCPO layer, would need an additional alignment layer.

According to a second aspect of the invention there is provided a material composition comprising polymerizable liquid crystals and one or more photo-orientable substances (PLCPO) for use in the methods and devices according to the invention.

The PLCPO material may comprise more than one type of photo-orientable substance.

The PLCPO material may further contain a photo-initiator and/or an inhibitor, a light stabilizer, isotropic or anisotropic fluorescent and/or non-fluorescent dyes, dichroic dyes and/or chiral additives as well as other additives for improving rheological properties or adhesion.

Preferred are PLCPO materials in which the weight ratio of the sum of the photo-orientable substances to the sum of the polymerizable liquid crystals is less than 0.5, more preferable less than 0.2 and most preferred less than 0.1. Depending on the thickness of a PLCPO layer, the percentage by weight of photo-orientable substances in the PLCPO material may be less than 5%, less than 1 wt % or even less than 0.1 wt %. In extreme cases 0.01 wt % of photo-orientable substance is enough to still achieve sufficient alignment properties. Preferably, the photo-orientable substance comprises fluorinated and/or siloxane moieties and/or is a polysiloxane, in order to support phase separation. Preferably, the photo-orientable substance is a polymer and comprises fluorinated moieties in the side chain. Examples of photo-orientable polysiloxanes are disclosed in WO2017/081056. Photo-orientable substances comprising fluorinated moieties can, for example, be found in U.S. Pat. No. 8,173,749 B. US 2011/0065859 A1, US 2012/0316317 A1, U.S. Pat. No. 9,097,938 B2, US 2016/0083655 A1, US 2016/0271894 A1. These patent and patent applications are incorporated by reference with regard to the fluorinated substances. The fluorinated moieties in the examples of above patents and patent applications are mainly part of a side chain of a polymer. Accordingly, those side chains strongly influence phase separation. For the purpose of the present invention other main chain structures may, therefore, be used in combination with the fluorinated side chain structures than the specific main chain structures of the examples in the above listed patents. In a preferred embodiment, a PLCPO material comprises two different types of photo-orientable substances, wherein one of them tends to migrate to the upper surface of a PLCPO layer and the other tends to migrate to the bottom of the layer.

Preferably a PLCPO material comprises one or more of the photo-orientable substances PA2, PA3 or PA4, which are described in the examples below.

In order to support phase separation, the photo-orientable substance and the polymerizable liquid crystal material can be so selected that the monomer dipole moments of the photo-orientable substance and of the liquid crystal molecules are different from each other. The monomer dipole moment shall refer to the dipole moment of a monomer or in case of polymers, oligomers and prepolymers to the dipole moment of monomeric units of such polymers, oligomers and prepolymers, respectively. Preferably, the monomer dipole moments differ by more than 0.5 Debye, more preferably by more than 1 Debye and most preferred by more than 1.5 Debye.

A photo-orientable substance in a PLCPO material may be any kind of photo-sensitive material in which anisotropic properties, which provide alignment properties for a slave material can be created upon exposure to aligning light, independent from the photo-reaction mechanism. Therefore, suitable photo-orientable substances are, for example, materials in which upon exposure to aligning light the anisotropy is induced by photo-dimerization, photo-decomposition, trans-cis isomerization or photo-fries rearrangement. Preferred PLCPO materials comprise a photo-orientable substance, in which photo-dimerization can be initiated upon exposure to aligning light.

Photo-orientable substances, as those described above, incorporate photo-orientable moieties, which are capable of developing a preferred direction upon exposure to aligning light and thus creating anisotropic properties. Such photo-orientable moieties preferably have anisotropic absorption properties. Typically, such moieties exhibit absorption within the wavelength range from 230 to 500 nm. Preferably, the photo-orientable moieties exhibit absorption of light in the wavelength range from 300 to 450 nm, more preferred are moieties, which exhibit absorption in the wavelength range from 310 to 380 nm.

Preferably the photo-orientable moieties have carbon-carbon, carbon-nitrogen, or nitrogen-nitrogen double bonds.

For example, photo-orientable moieties are substituted or un-substituted azo dyes, anthraquinone, coumarin, mericyanine, 2-phenylazothiazole, 2-phenylazobenzthiazole, stilbene, cyanostilbene, fluorostilbene, cinnamonitrile, chalcone, cinnamate, cyanocinnamate, stilbazolium, 1,4-bis(2-phenylethylenyl)benzene, 4,4'-bis(arylazo)stilbenes, perylene, 4,8-diamino-1,5-naphthoquinone dyes, aryloxy-carboxylic derivatives, arylester, N-arylamide, polyimide, diaryl ketones, having a ketone moiety or ketone derivative in conjugation with two aromatic rings, such as for example substituted benzophenones, benzophenone imines, phenyl-hydrazones, and semicarbazones.

Preparation of the anisotropically absorbing materials listed above are well known as shown, e.g. by Hoffman at al., U.S. Pat. No. 4,565,424, Jones et al., in U.S. Pat. No. 4,401,369, Cole, Jr. et al., in U.S. Pat. No. 4,122,027, Etzbach et al., in U.S. Pat. No. 4,667,020, and Shannon et al., in U.S. Pat. No. 5,389,285.

Preferably, the photo-orientable moieties comprise arylazo, poly(arylazo), stilbene, cyanostilbene, cinnamate or chalcone.

A photo-orientable substance may in particular be a monomer, a oligomer or a polymer. The photo-orientable moieties can, for example, be covalently bonded within the main chain or within a side chain of a polymer or oligomer or they may be part of a monomer or other compounds which are not polymerizable. A photo-orientable substance may further be a copolymer comprising different types of photo-orientable moieties or it may be a copolymer comprising side chains with and without photo-orientable moieties.

Polymers denotes for example to polyacrylate, polymethacrylate, polyimide, polyurethane, polyamic acids, polymaleinimide, poly-2-chloroacrylate, poly-2-phenylacrylate; unsubstituted or with $C_1$-$C_6$alkyl substituted poylacrylamide, polymethacyrlamide, poly-2-chloroacrylamide, poly-2-phenylacrylamide, polyether, polyvinylether, polyester, polyvinylester, polystyrene-derivatives, polysiloxane, straight-chain or branched alkyl esters of polyacrylic or polymethacrylic acids; polyphenoxyalkylacrylates, polyphenoxyalkylmethacrylates, polyphenylalkylmeth-acrylates with alkyl residues of 1-20 carbon atoms; polyacrylnitril, polymethacrylnitril, cycloolephinic polymers, polystyrene, poly-4-methylstyrene or mixtures thereof.

A photo-orientable substance may also comprise photo-sensitizers, for example, ketocoumarines and benzophenones.

Further, preferred photo-orientable monomers or oligomers or polymers are described in U.S. Pat. Nos. 5,539,074, 6,201,087, 6,107,427, 6,632,909 and 7,959,990.

According to a third aspect of the invention there are provided stacks of anisotropic layers made by using a method according to the invention as well as related materials.

FIG. 1 depicts a prior art layer structure 1 known from above mentioned U.S. Pat. No. 6,717,644B2, in which a liquid crystal polymer layer 13 is aligned by an alignment layer 12 on a substrate 11. A second alignment layer 14 on top of LCP layer 13 provides alignment for a liquid crystal material. At least in one area the alignment direction provided by layer 14 is different from the orientation direction in the liquid crystal layer 13 in the region below the above area.

Figure 2:
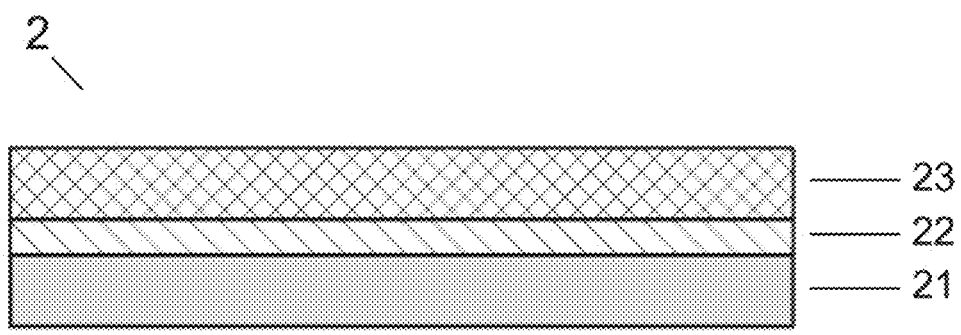
FIG. 2 depicts a simple stack according to the invention wherein a PLCPO layer, which has been polymerized and exposed to aligning light, provides alignment for a slave material.

Structure 2 in FIG. 2, which is according to the invention, needs only 2 layers above the substrate 21 to achieve the same properties as the prior art structure in FIG. 1. The alignment layer 22 above the substrate orients the liquid crystal materials in a PLCPO layer 23. Stack 2 has been manufactured according to the method of the invention. Accordingly, the top surface of layer 23 provides alignment for a slave material such that at least in one area the alignment direction provided by layer 23 is different from the liquid crystal orientation in layer 23 just beneath the upper surface. The liquid crystals in layer 23 may have locally different alignment. Also the alignment on the surface of the PLCPO layer 23 may be in the form of an orientation pattern, which does not have to be the same as the one defined by the orientation variation of the liquid crystals inside layer 23. Depending on the composition of the PLCPO material used for preparation of layer 23, layer 23 may, for example, be birefringent, can act as a polarizer, may be twisted or may be cholesteric. The alignment layer 22 is not necessarily required, as other means of aligning the polymerizable liquid crystals in the PLCPO layer can be used, as described further above. In the simplest case, a structure according to the invention consists of a single layer 23 on a support 21. The support may have additional layers, such as organic, dielectric or metallic layers, as described above.

Preferably, the PLCPO layer is birefringent and has the function of an optical retarder. For most applications, the optical retardation is higher than 10 nm. Preferably, the retardation is higher than 50 nm, more preferred higher than 100 nm. In particular, the PLCPO layer may act as a quarter wave or half wave retarder.

For typical materials in the PLCPO layer, the thickness of the PLCPO layer is larger than 100 nm, preferably larger than 500 nm, more preferred larger than 1 µm. For some applications the thickness of the PLCPO layer is larger than 2 µm or even larger than 3 µm.

Preferably, the ratio of the amounts of photo-orientable substance to that of the other compound(s) preferably varies along the thickness direction of layer 23, which means that there is a concentration gradient of the photo-orientable substance along the thickness direction. Preferably, the concentration of photo-orientable substance is higher at the upper surface of the PLCPO layer than in the middle of the layer. More preferred, the photo-orientable substance and the polymerized liquid crystals are phase separated. Preferably, the phase separated photo-orientable substance is arranged as a layer above and/or below the polymerized liquid crystals. Preferably, the photo-orientable substance comprises fluorinated and/or siloxane moieties and/or is a polysiloxane, in order to support a concentration gradient or phase separation.

Structure 2 as described above, with or without alignment layer 22, can, for example, be used as a substrate for liquid crystal displays, including single pixel cells, in which layer 23 has the optical function of a polarizer or a retarder or a twisted retarder or a cholesteric layer and whereas the surface of layer 23 provides alignment for the switchable liquid crystals to be filled in the liquid crystal cell. In other applications structure 2 can be used as a substrate for optical films, on which, for example, liquid crystal polymer materials can be coated, which will then be aligned according to the alignment information provided by the surface of layer 23.

Figure 3:
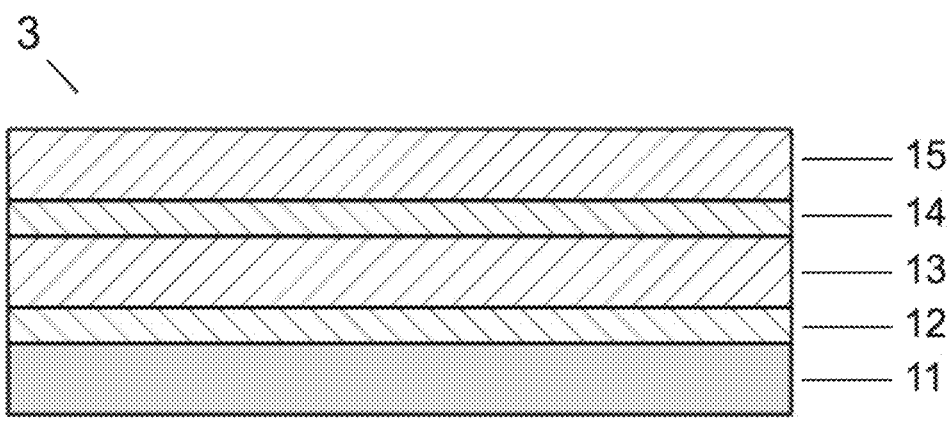
FIG. 3 depicts an example of a state of the art LCP stack, in which two LCP layers are stacked above each other. Each LCP layer is aligned by a separate aligning layer.

Prior art structure 3, also disclosed in U.S. Pat. No. 6,717,644B2 and depicted in FIG. 3, comprises an LCP layer 15 on top of the alignment layer 14. The two alignment layers 12 and 14 may provide individual alignment information for each of the LCP layers 13 and 15. This allows having different liquid crystal orientation directions in opposed regions of LCP layers 13 and 15.

Figure 4:
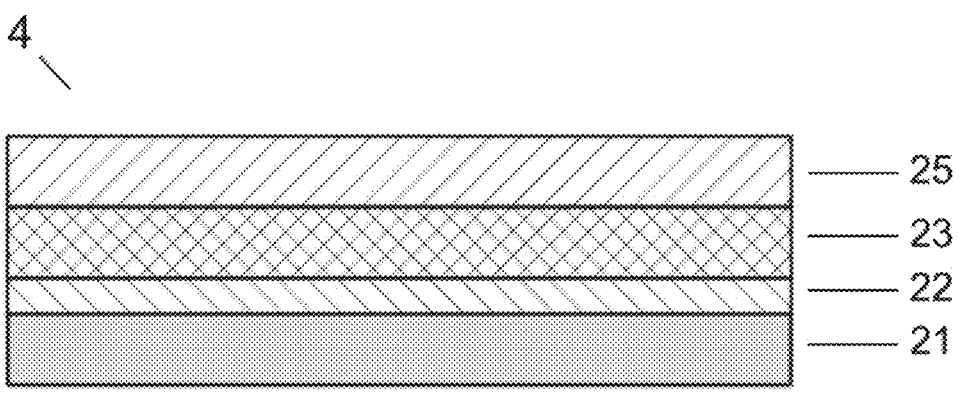
FIG. 4 shows a layer stack in which a layer of a slave material is aligned by a PLCPO layer.

In addition to structure 2, structure 4 in FIG. 4 comprises a layer of a slave material 25 in contact with the photo-aligned surface of PLCPO layer 23. The slave material has been aligned by the photo-aligned surface of layer 23. Preferably, the slave material comprises an LCP material. An LCP material may further comprise additives such as dichroic dyes and/or chiral additives. Accordingly, layer 25 may be birefringent, can act as a polarizer, may be twisted or may be cholesteric. As described with regard to structure 2, the alignment layer 22 is optional. The features of layer 23 are as described with regard to FIG. 2. Depending on the composition of the PLCPO material used for preparation of layer 23, for example layer 23 maybe birefringent, can act as a polarizer, may be twisted or may be cholesteric.

Any combination of functions of layer 23 and layer 25 is possible. In preferred layer structures of the invention layer 23 comprises an LCP material. In a preferred embodiment of the invention, PLCPO layer 23 as well as layer 25 are birefringent and have the function of retarders. One of the layers 23 or 25 may have the retardance corresponding to a quarter wave plate and the other may have the retardance corresponding to a half wave plate. By selecting a proper angle between the optical axis of both retarders, for example in the range of 40° to 70°, an achromatic retarder can be realized, following well-known concepts, for example S. Pancharatnam, "Achromatic combinations of birefringent plates. Part II: An achromatic quarter-WP," Proc. Ind. Acad. Sci. 41, 137 (1955).

Achromatic retarders can replace standard uniaxial retarders in many applications, with the advantage that the optical effect provided by the retarder works almost independent from the wavelength of the light. In particular, achromatic retarders can be combined with reflective polarizers, such as the commercially available Vikuity™ DBEF film, for efficient management of polarized light, for example in LCDs.

In another preferred embodiment of the invention one of the layers 23 or 25 has the function of a retarder, whereas the other layer includes a dichroic dye and acts as a linear polarizer. Any angle between the absorption direction of the polarizing layer and the optical axis of the retarder layer can be chosen. If the retarder layer has quarter wave retardance and the optical axis makes an angle of 45° with the absorption direction of the polarizing layer, then the two layers together act as a circular polarizer. Circular polarizers can convert isotropic light into circularly polarized light and have many applications in optical instruments and devices. Examples are passive 3D-glasses or antireflection structures, which are, for example, used on top of OLED displays to prevent reflections of environmental light.

In another preferred embodiment of the invention one of the layers 23 or 25 has the function of a retarder, whereas the other layer includes a chiral additive in a proper amount for a twisted retarder. By proper adjusting thicknesses of the layers as well as the twist angle, achromatic behavior can be achieved as an alternative to the above mentioned achromatic retarders using layers of uniaxial retarders.

In another preferred embodiment of the invention one of the layers 23 or 25 has the function of a retarder, whereas the other layer includes a chiral additive and acts as a cholesteric layer. Because the retarder layer includes liquid crystals the optical axis can be locally adjusted in any direction. Since the retarder layer is not visible in isotropic environmental light, but can be made visible on demand by analyzing the element through a linear or circular polarizer, such elements are attractive for use in optical security devices.

Figure 5:
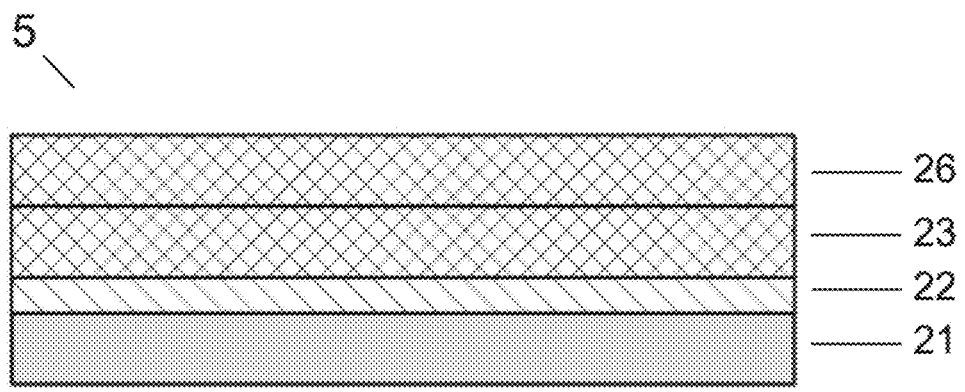
FIG. 5 shows an element comprising two PLCPO layers, wherein the liquid crystals in the second PLCPO layer are oriented by the alignment induced in the surface of the first PLCPO layer.

In structure 5 of FIG. 5 the PLCPO material is used as a slave material so that a second PLCPO layer 26 is on top of the first PLCPO layer 23. The liquid crystals in the PLCPO layer have been aligned by the photo-aligned surface of layer 23. As described with regard to structure 2, the alignment layer 22 is optional. The features of layer 23 are as described with regard to FIG. 2. The liquid crystals in PLCPO layer 26 have been aligned by the photo-aligned surface of PLCPO layer 23. Since layer 26 also comprises a photo-orientable substance, its surface can be treated by photo-alignment in order to provide alignment information, which may be in the form of an orientation pattern, for another slave material on top. Depending on the composition of the PLCPO material used for preparation of layer 26, layer 26 may, for example, be birefringent, can act as a polarizer, may be twisted or may be cholesteric.

Figure 6:
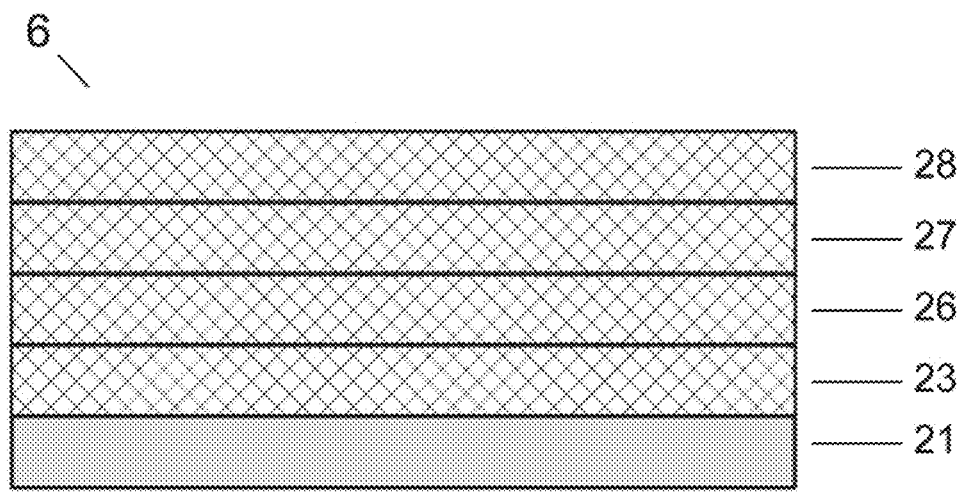
FIG. 6 shows an element comprising 4 PLCPO layers, in which PLCPO layers are aligned by the alignment information of another PLCPO layer and provide alignment information for the next PLCPO layer.

Structure 6 in FIG. 6 shows another configuration according to the invention. It comprises 4 PLCPO layers 23, 26, 27, 28 on top of each other. Optionally, there may be an alignment layer between support 21 and PLCPO layer 23. Each of the layers 23, 26, 27, 28 has its own optical function depending on the PLCPO composition used for the respective layer. Accordingly, each layer independently from the others may be birefringent, can act as a polarizer, may be twisted or may be cholesteric. Each of the layers has been exposed to aligning light to generate the alignment information which is provided to the PLCPO layer above. The polymerized liquid crystals in layer 26 have been aligned by the surface of layer 23. The polymerized liquid crystals in layer 27 have been aligned by the surface of layer 26 and the polymerized liquid crystals in layer 28 have been aligned by the surface of layer 27. Layer 28 also has an aligning surface and provides alignment information for a slave material that could be coated on top. Manufacturing of structures comprising a plurality of PLCPO layers like that of FIG. 6, benefit particularly from the invention, as otherwise according to prior art, each optically functional layer, for example LCP layers, would need an individual alignment layer.

In each of the structures 2, 4, 5, 6, which are according to the invention, the surface of each of the PLCPO layers may provide tilted alignment. Value and direction of the pretilt angle as transferred into a slave material may locally vary. Tilted alignment can be achieved by oblique exposure of a PLCPO layer.

Similar to layer 23 it is preferred that the ratio of the amounts of photo-orientable substance to that of the other compound(s) varies along the thickness direction of layer 26 or any further PLCPO layer, which means that there is a concentration gradient of the photo-orientable substance along the thickness direction. Preferably, the concentration of photo-orientable substance is higher at the upper surface of the PLCPO layer than in the middle of the layer. More preferred, the photo-orientable substance and the polymerized liquid crystals are phase separated. Preferably, the phase separated photo-orientable substance is arranged as a layer above and/or below the polymerized liquid crystals.

A preferred embodiment of the invention has three layers comprising liquid crystal polymers, which together act as an achromatic circular polarizer, and which can, for example, be used as antireflection structure for OLED displays. Two of the layers comprising liquid crystal polymers may be PLCPO layers and the third layer may be a layer comprising LCP but no photo-orientable substance or the third layer may also be a PLCPO layer. Either the lowest or the upper of the three layers comprises an aligned dichroic dye and therefore acts as a linear polarizer, whereas the other two layers are birefringent and are arranged with regard to each other as well as with regard to the polarizing layer to act as an achromatic retarder following the known concept as described above.

Other specific embodiments are achromatic retarders with more than two liquid crystal polymer containing layers, also based on the concept of Pancharatnam, as cited above, but with an improved achromatic performance.

Specific examples for layer structures requiring a plurality of optically anisotropic layers are interference color filters, such as Solc or Lyot filters. Each of the layers in a Solc filter needs a different orientation of the optical axis. Therefore, if a Solc filter is realized with prior art technique LCP stacks, the total number of layers is twice the number of LCP layers, as each LCP layer needs a separate alignment layer. If the layer structure of FIG. 6, which is according to the invention, is used, the number of layers in a Solc filters is reduced by a factor of two. Hence, the invention drastically reduces production time and costs and simultaneously increases the yield in production.

Devices according to the invention can, for example, be used in combination with brightness enhancement films for LCDs, organic light emitting devices (OLED), like displays or OLED lighting applications. Further devices according to the invention may be used as part of backlight units for LCDs. Preferably, devices according to the invention are used in optical security elements.

EXAMPLES

Materials Used in the Examples
Compounds
Photo-Alignment Material PA1

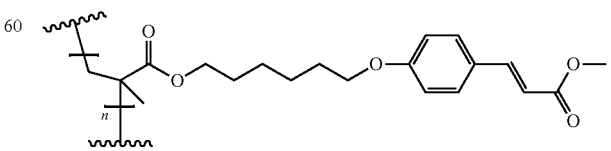

Synthesized as described in patent application WO2012/085048 A1

Photo-Alignment Material PA2

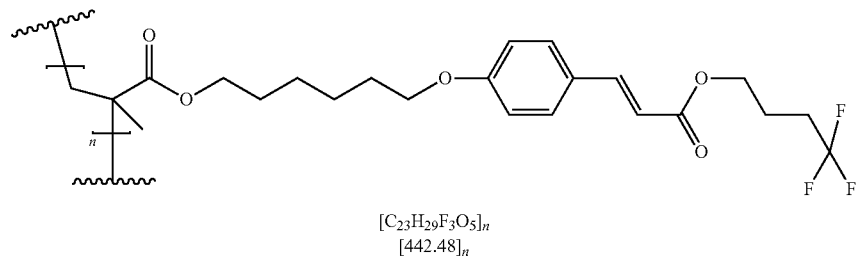

$[C_{23}H_{29}F_3O_5]_n$
$[442.48]_n$ prepared according to preparation example A4 of WO2015024810A1

Photo-Alignment Material PA3
Co-polymer with x=80 and y=20

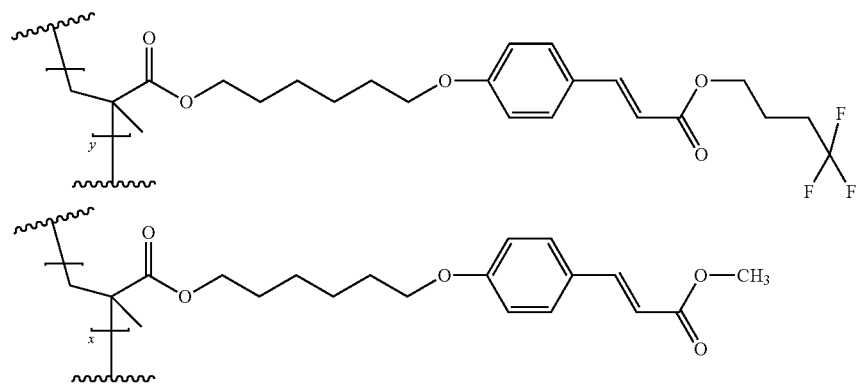

prepared according to preparation example A6 of WO2015024810A1

Photo-Alignment Material PA4
Co-polymer with x=90 and y=10

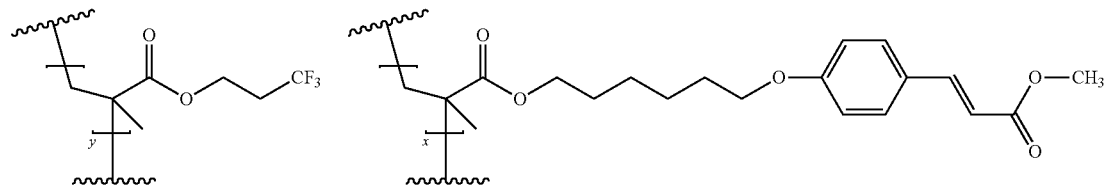

prepared similarly to example A6 of WO2015024810A1

Crosslinkable Liquid Crystal Compound LCC1 pentyl 2,5-bis[[4-(6-prop-2-enoyloxyhexoxy)benzoyl]oxy]benzoate prepared in analogy to Schemes 1, 2, 3, 4 of U.S. Pat. No. 5,593,617

Crosslinkable Liquid Crystal Compound LCC2

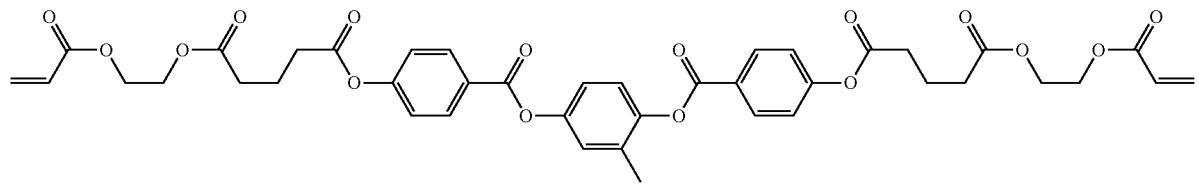 [SMILES: C=CC(=O)OCCOC(=O)CCCC(=O)Oc1ccc(C(=O)Oc2ccc(OC(=O)c3ccc(OC(=O)CCCC(=O)OCCOC(=O)C=C)cc3)c(C)c2)cc1]

Crosslinkable Liquid Crystal Compound LCC3

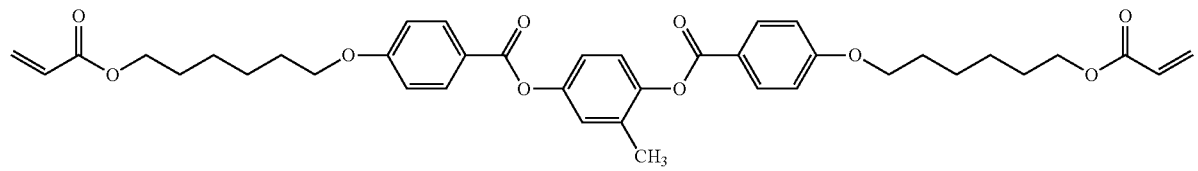 [SMILES: C=CC(=O)OCCCCCCOc1ccc(C(=O)Oc2ccc(OC(=O)c3ccc(OCCCCCCOC(=O)C=C)cc3)c(C)c2)cc1]

Dichroic Dye dDye

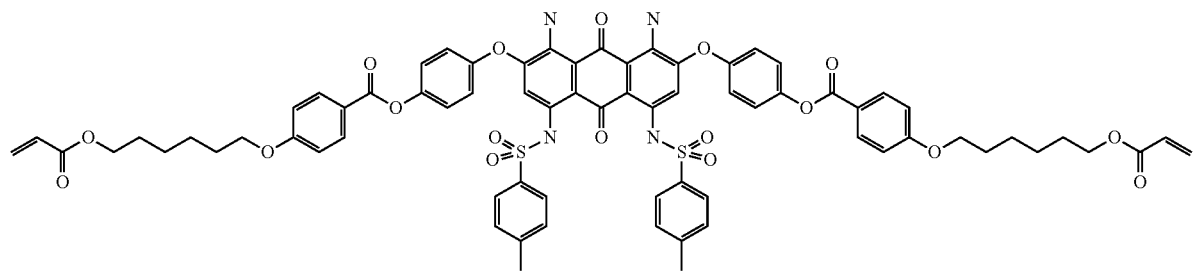 [SMILES: C=CC(=O)OCCCCCCOc1ccc(C(=O)Oc2ccc(Oc3cc(NS(=O)(=O)c4ccc(C)cc4)c4c(c3N)C(=O)c3c(N)c(Oc5ccc(OC(=O)c6ccc(OCCCCCCOC(=O)C=C)cc6)cc5)cc(NS(=O)(=O)c5ccc(C)cc5)c3C4=O)cc2)cc1]

Prepared according to WO2015/177062.

Compositions

Polymerizable Liquid Crystal Material M-LCP1

| | |
|---|---|
| 95.525 wt % | LCC1 |
| 2 wt % | Irgacure OXE 02 (BASF) |
| 2 wt % | Kayarad DPCA-20 (Nippon Kayaku) |
| 0.25 wt % | TEGO Flow 300 (Evonik) |
| 0.2 wt % | Tinuvin 123 (BASF) |
| 0.025 wt % | BHT (Aldrich) |

Polymerizable Liquid Crystal Material M-LCP2

| | |
|---|---|
| 95.4 wt % | LCC2 |
| 4 wt % | Irgacure 907 (BASF) |
| 0.5 wt % | Tego Flow 300 (Evonik) |
| 0.1 wt % | BHT (Aldrich) |

Polymerizable Liquid Crystal Material M-dLCP, Comprising a Dichroic Dye

| | |
|---|---|
| 87.8 wt % | LCC2 |
| 10 wt % | dDye |
| 2 wt % | Irgacure 369 (BASF) |
| 0.2 wt % | BHT (Aldrich) |

PLCPO Material M-PLCPO1

| | |
|---|---|
| 97.775 wt % | LCC2 |
| 1 wt % | PA2 |
| 1 wt % | Irgacure 907 (BASF) |
| 0.2 wt % | Tinuvin 123 (BASF) |
| 0.025 wt % | BHT (Aldrich) |

The clearing temperature of M-PLCPO1 is about 76° C.

PLCPO Material M-PLCPO2

| | |
|---|---|
| 97.775 wt % | LCC2 |
| 1 wt % | PAS |
| 1 wt % | Irgacure 907 (BASF) |
| 0.2 wt % | Tinuvin 123 (BASF) |
| 0.025 wt % | BHT (Aldrich) |

The clearing temperature of M-PLCPO2 is about 76° C.

PLCPO Material M-PLCP03

| | |
|---|---|
| 97.775 wt % | LCC2 |
| 1 wt % | PA4 |
| 1 wt % | Irgacure 907 (BASF) |
| 0.2 wt % | Tinuvin 123 (BASF) |
| 0.025 wt % | BHT (Aldrich) |

The clearing temperature of M-PLCPO3 is about 76° C.

PLCPO Material M-dPLCPO

| | |
|---|---|
| 86.8 wt % | LCC2 |
| 1 wt % | PA2 |
| 10 wt % | dDye |
| 2 wt % | Irgacure 369 (BASF) |
| 0.2 wt % | BHT (Aldrich) |

Cholesteric PLCPO Material M-cPLCPO

| | |
|---|---|
| 54.7 wt % | LCC1 |
| 37.4 wt % | LCC3 |
| 3.6 wt % | Lumogen S750 (BASF) |
| 3 wt % | Irgacure 907 (BASF) |
| 1 wt % | PA2 |
| 0.2 wt % | Irgafos 168 (BASF) |
| 0.1 wt % | BHT (Aldrich) |

Solutions

S-PA1

The solution S-PA1 is prepared by dissolving 3 wt % of the photo-alignment material PA1 in 97 wt % Methoxy propyl acetate and stirring the solution for 30 minutes at room temperature.

S-LCP1

The solution S-LCP1 is prepared by dissolving 35 wt % of M-LCP1 in 65 wt % of a solvent mixture of 80 wt % Butyl acetate and 20 wt % Cyclohexanone and stirring the solution for 30 minutes at room temperature.

S-LCP2

The solution S-LCP2 is prepared by dissolving 10 wt % of M-LCP2 in 90 wt % of a solvent mixture of 80 wt % Methoxy propyl ketone, 10 wt % Dioxalane and 10 wt % Cyclohexanone and stirring the solution for 30 minutes at room temperature.

S-dLCP

The solution S-dLCP is prepared by dissolving 40 wt % of M-dLCP in 60 wt % of a solvent mixture of 80% MEK and 20% Cyclohexanone and stirring the solution for 30 minutes at room temperature.

S-PLCPO1

The solution S-PLCPO1 is prepared by dissolving 35 wt % of M-PLCPO1 in 65 wt % of a solvent mixture of 80% Butyl acetate and 20% Cyclohexanone and stirring the solution for 30 minutes at room temperature.

S-PLCPO2

The solution S-PLCPO2 is prepared by dissolving 35 wt % of M-PLCPO2 in 65 wt % of a solvent mixture of 80% Butyl acetate and 20% Cyclohexanone and stirring the solution for 30 minutes at room temperature.

S-PLCP03

The solution S-PLCPO3 is prepared by dissolving 35 wt % of M-PLCPO3 in 65 wt % of a solvent mixture of 80% Butyl acetate and 20% Cyclohexanone and stirring the solution for 30 minutes at room temperature.

S-dPLCPO

The solution S-dPLCPO is prepared by dissolving 40 wt % of M-dPLCPO in 60 wt % of a solvent mixture of 80% MEK and 20% Cyclohexanone and stirring the solution for 30 minutes at room temperature.

S-cPLCPO

The solution S-cPLCPO is prepared by dissolving 26 wt % of M-cPLCPO in 74 wt % of a solvent mixture of 80 wt % Methoxy propyl ketone, 10 wt % Dioxalane and 10 wt % Cyclohexanone and stirring the solution for 30 minutes at room temperature.

Example 1, Preparation of a Primer Coated Substrate

A triacetate cellulose (TAC) foil was coated by means of Kbar coater (bar size 1) with a primer solution (DYMAX OC-4021 20 w % solid content in 80% Butyl acetate). The wet film was dried at 80° C. for 30 s; the thickness of the resulting dry film was about 2 µm. Then the dry film was exposed to UV light (1500 mJ, under inert $N_2$ atmosphere) at room temperature.

Example 2. Achromatic Quarter Wave Retarder on Flexible Substrate

A primer coated TAC substrate of example 1 was Kbar coated (bar size 0) with photo-alignment solution S-PA1. The wet film was dried at 80° C. for 30 s; the dry film thickness was about 100 nm. Then the dry film was exposed to collimated, linearly polarized UV (LPUV) light (280-320 nm; 50 mJ/cm$^2$) at room temperature. The plane of polarization was 20° with regard to a reference edge on the TAC substrate.

On top of the exposed photo-alignment layer a layer was formed from the solution S-PLCPO1 by Kbar coating (bar size 2). The wet film was annealed and dried at 50° C. for 60 s and subsequently crosslinked at room temperature under nitrogen upon irradiation with 200 mJ/cm$^2$ of the light of a high pressure mercury lamp. The dry film thickness was 2.2 µm.

When the film was analyzed between crossed polarizers, it was found that the film was birefringent with an optical axis oriented at 20° with regard to the reference edge of the TAC film. An optical retardation of 270 nm was measured with a tilting compensator.

The PLCPO layer was then exposed to collimated LPUV light (280-320 nm; 150 mJ/cm$^2$) with the polarization plane at 80° with regard to the above reference edge on the TAC substrate. After exposure to LPUV light, the film was analyzed again. It was found that the optical properties have not changed upon exposure. In particular the film was uniaxially birefringent, without any twist, with an optical axis oriented at 20° with regard to the reference edge of the TAC film. An optical retardation was still about 270 nm.

Subsequently, LCP solution S-LCP1 was Kbar coated (bar size 1) on top of the PLCPO layer. The wet film was annealed and dried at 50° C. for 60 s and crosslinked at room temperature under nitrogen upon irradiation with 1500 mJ/cm$^2$ of the light of a high pressure mercury lamp.

Figure 7:
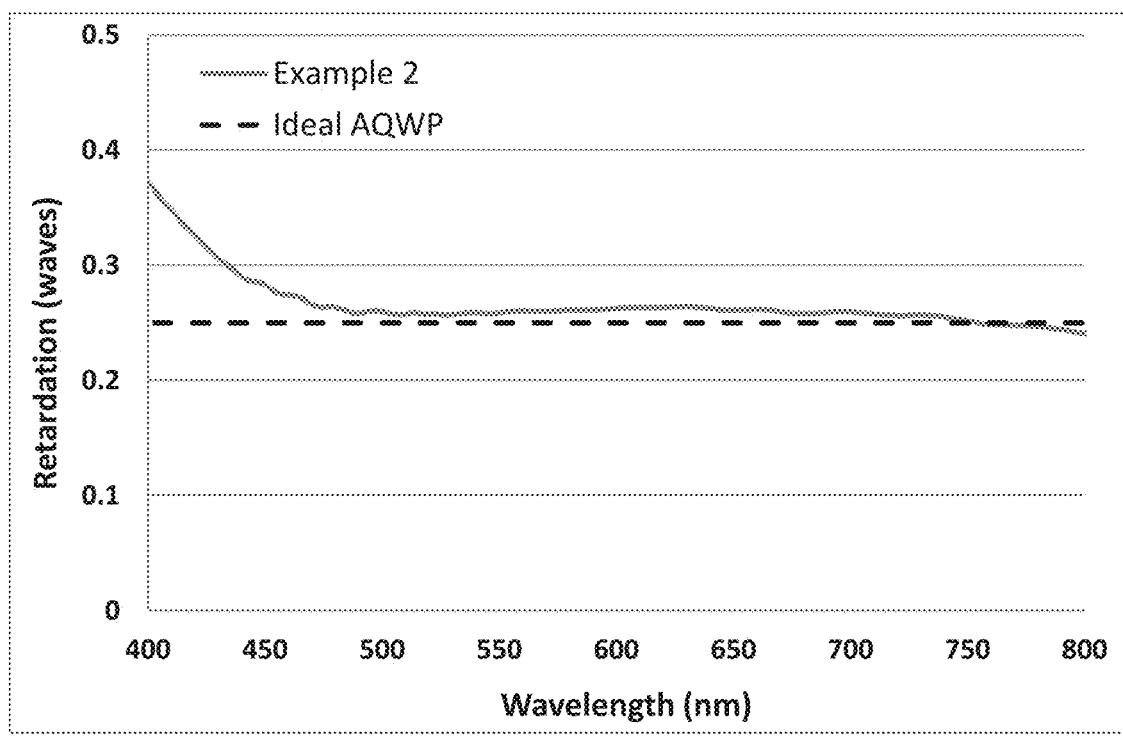
FIG. 7 shows the achromatic optical property of the layer structure prepared in example 2.

The resulting film exhibited a homogeneous appearance without any visible defect. By analyzing the film by ellipsometry it was found that the film had the properties of an achromatic quarter wave plate (AQWP), as shown in FIG. 7. From the ellipsometric evaluation it was also found that the LCP1 layer had an optical retardation of 130-140 nm and that the orientation of the optical axis of the LCP1 layer was at 80° with regard to the above reference edge on the TAC substrate.

Example 3, Achromatic Quarter Wave Retarder, Single Exposure for Cross-Linking and Orientation In the same way as in example 2, a primer coated TAC substrate was coated with the photo-alignment solution S-PA1, dried and exposed to aligning light with the plane of polarization at 20° with regard to a reference edge on the TAC substrate.

As in example 2, a layer was formed from the solution S-PLCPO1 on top of the exposed photo-alignment layer by Kbar coating (bar size 2). The wet film was annealed and dried at 50° C. for 60 s.

In order to simultaneously cross-link the LCP material in the PLCPO layer and to create alignment on the surface of the PLCPO layer, the layer was exposed to polarized UV (A+B) light at room temperature under nitrogen with the polarization plane at 80° (1500 mJ/cm2 of Hg-lamp, 300-390 nm) with regard to the reference edge on the TAC substrate.

After the exposure process, the PLCPO layer was confirmed to be solidified. Further, it was found that the film was birefringent with an optical axis oriented at 20° with regard to the reference edge of the TAC film. An optical retardation of 270 nm was measured with a tilting compensator.

Subsequently, a layer from LCP solution S-LCP1 was formed on top of the PLCPO layer, annealed, dried and crosslinked in the same way as in example 2.

The resulting film exhibited a homogeneous appearance without any visible defect. By analyzing the film by ellipsometry it was found that the film had the properties of an achromatic quarter wave plate. From the ellipsometric evaluation it was also found that the LCP1 layer had an optical retardation of 130-140 nm and that the orientation of the optical axis of the LCP1 layer was at 80° with regard to the above reference edge on the TAC substrate.

Example 4, Achromatic Quarter Wave Retarder. LPUV Exposure Prior to PLCPO Cross-Linking In the same way as in example 2, a primer coated TAC substrate was coated with the photo-alignment solution S-PA1, dried and exposed to aligning light with the plane of polarization at 20° with regard to a reference edge on the TAC substrate.

As in example 2, a layer was formed from the solution S-PLCPO1 on top of the exposed photo-alignment layer by Kbar coating (bar size 2). The wet film was annealed and dried at 50° C. for 60 s.

The PLCPO layer was then exposed at room temperature to collimated LPUV light (280-320 nm; 100 mJ/cm$^2$) with the polarization plane at 80° with regard to the reference edge on the TAC substrate.

Thereafter the LCP molecules in the PLCPO layer were crosslinked under nitrogen by irradiating 1000 mJ/cm$^2$ light of a Hg-lamp. The dry film thickness was 2.2 µm.

The substrate with the PLCPO layer was kept at room temperature during and after exposure to LPUV light until the LCP material in the PLCPO material was cross-linked. Because of the relatively high viscosity of the PLCPO material at room temperature, the LCP molecules did not reorient upon exposure to LPUV light. This was confirmed by analyzing the cross-linked PLCPO layer between crossed polarizers, which showed uniaxial alignment of the optical axis at 20° with regard to the reference edge of the TAC substrate. An optical retardation of about 270 nm was measured with a tilting compensator.

Subsequently, a layer from LCP solution S-LCP1 was formed on top of the PLCPO layer, annealed, dried and crosslinked in the same way as in example 2.

Figure 8:
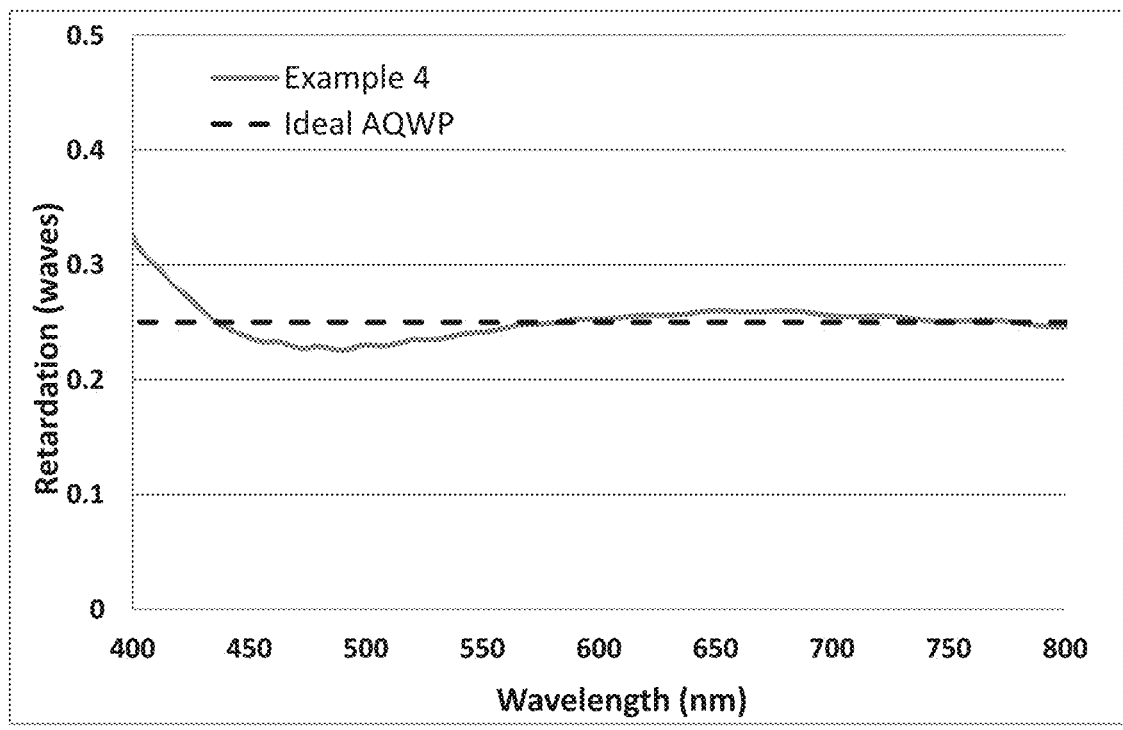
FIG. 8 shows the achromatic optical property of the layer structure prepared in example 4.

The resulting film exhibited a homogeneous appearance without any visible defect. By analyzing the film using an ellipsometer it was found that the film had the properties of an achromatic quarter wave plate, as shown in FIG. 8. From the ellipsometric evaluation it was also found that the LCP1 layer had an optical retardation of 130-140 nm and that the orientation of the optical axis of the LCP1 layer was at 80° with regard to the above reference edge on the TAC substrate.

Example 5, Exposed and Non-Exposed Areas of the PLCPO Layer

A photo-alignment layer and a PLCPO film have been prepared on a primer coated TAC substrate in the same way as in example 2. The only difference to example 2 was that only one half of the PLCPO layer area was exposed to collimated LPUV light (280-320 nm; 150 mJ/cm$^2$) with the polarization plane at 80° with regard to the reference edge on the TAC substrate. The other half of the PLCPO layer area was not exposed to aligning light. Then an LCP layer was prepared on top of the PLCPO layer again following the process of example 2.

When the resulting film was analyzed between crossed polarizers, it was found that in the area, in which the PLCPO layer was not exposed to aligning light, a uniaxial retarder was created with a retardation of about 410 nm, which is an increase of the retardation as compared to the retardation of the PLCPO layer alone. This means that the liquid crystals of the LCP layer were aligned in the same direction as the liquid crystals in the PLCPO layer.

The area in which the PLCPO layer was exposed to aligning light was found to show similar optical performance as the film produced in example 2.

Example 6, Production of a Circular Polarizer with a PLCPO Layer Comprising a Dye A primer coated TAC substrate was coated with the photo-alignment solution S-PA1, dried and exposed to aligning light similar to example 2, the only difference being that the plane of polarization was 0° with regard to a reference edge, instead of 20°.

On top of the exposed photo-alignment layer a layer was formed from the solution S-dPLCPO, which comprises a dichroic dye, by Kbar coating (bar size 2). The wet film was annealed and dried at 61° C. for 60 s and crosslinked at room temperature under nitrogen upon irradiation with 1500 mJ/cm$^2$ of the light of a Hg-lamp. The dry film thickness was about 2.2 µm.

The film was found to act as a linear polarizer.

The PLCPO layer was then exposed to collimated LPUV light (280-320 nm; 150 mJ/cm$^2$) with the polarization plane at 45° with regard to the reference edge on the TAC substrate.

Subsequently, LCP solution S-LCP1 was Kbar coated (bar size 1) on top of the PLCPO layer. The wet film was annealed and dried at 50° C. for 60 s and crosslinked at room temperature under nitrogen upon irradiation with 1500 mJ/cm$^2$ of the light of a Hg-lamp. From the examples above, it is known that the optical retardation of the LCP1 layer is 130-140 nm, which corresponds to quarter wave retardation for green light.

When analyzing the resulting device it was found that it acts as a circular polarizer. This confirms that the optical axis direction of the LCP layer has been established along the 45° alignment direction induced by the exposure of the dye containing PLCPO layer to LPUV light.

Example 7, Production of a Circular Polarizer, LCP Layer Comprising a Dye

In the same way as in example 2, a primer coated TAC substrate was coated with the photo-alignment solution S-PA1, dried and exposed to aligning light with the plane of polarization at 0° with regard to a reference edge on the TAC substrate.

On top of the exposed photo-alignment layer a layer was formed from the solution S-PLCPO1 by Kbar coating (bar size 1). The wet film was annealed and dried at 50° C. for 60 s and subsequently crosslinked at room temperature under nitrogen upon irradiation with 200 mJ/cm$^2$ of the light of a high pressure mercury lamp. The dry film thickness was about 1.1 µm.

When the film was analyzed between crossed polarizers, it was found that the film was birefringent with an optical axis oriented at 0° with regard to the reference edge of the TAC film. An optical retardation of about 140 nm was measured with a tilting compensator.

The PLCPO layer was then exposed to collimated LPUV light (280-320 nm; 150 mJ/cm$^2$) with the polarization plane at 45° with regard to the reference edge on the TAC substrate.

Subsequently, LCP solution S-dLCP, comprising a dichroic dye, was Kbar coated (bar size 2) on top of the PLCPO layer. The wet film was annealed and dried at 61° C. for 60 s and crosslinked at room temperature under nitrogen upon irradiation with 1500 mJ/cm$^2$ of the light of a Hg-lamp.

When analyzing the resulting device it was found that it acts as a circular polarizer. This confirms that the absorption direction of the dichroic dyes embedded in the dLCP layer has been established along the 45° alignment direction induced by the exposure of the PLCPO layer to LPUV light.

Example 8, Patterned Circular Polarizer

In the same way as in example 2, a primer coated TAC substrate was coated with the photo-alignment solution S-PA1, dried and exposed to aligning light with the plane of polarization at 0° with regard to a reference edge on the TAC substrate.

On top of the exposed photo-alignment layer a layer was formed from the solution S-PLCPO1 by Kbar coating (bar size 1). The wet film was annealed and dried at 50° C. for 60 s and subsequently crosslinked at room temperature under nitrogen upon irradiation with 200 mJ/cm$^2$ of the light of a high pressure mercury lamp. The dry film thickness was about 1.1 μm.

When the film was analyzed between crossed polarizers, it was found that the film was birefringent with an optical axis oriented at 0° with regard to the reference edge of the TAC film. An optical retardation of about 140 nm was measured with a tilting compensator.

An alignment pattern was then generated in the surface of the PLCPO layer by a double exposure process. In a first step, the PLCPO layer was irradiated with collimated LPUV light (280-320 nm; 300 mJ/cm$^2$) with the polarization plane at 45° with regard to the reference edge on the TAC substrate through a photomask having opaque and transmissive areas. In a second step, the PLCPO layer was exposed to the LPUV light (280-320 nm; 150 mJ/cm$^2$) without the photomask but with the polarization plane at −45°.

Subsequently, LCP solution S-dLCP, comprising a dichroic dye, was Kbar coated (bar size 2) on top of the PLCPO layer. The wet film was annealed and dried at 61° C. for 60 s and crosslinked at room temperature under nitrogen upon irradiation with 1500 mJ/cm$^2$ of the light of a Hg-lamp.

When analyzing the resulting device it was found that it acts as a patterned circular polarizer, with a pattern of first and second areas corresponding to the pattern of the above photomask. When illuminating the device from the side opposite to the substrate, the transmitted light through the first areas was left handed circularly polarized, whereas the light transmitted through the second areas was right handed circularly polarized.

This confirms that the absorption directions of the dichroic dyes embedded in the dLCP layer have been established along the +45° and −45° alignment direction induced by the exposure of the PLCPO layer to LPUV light in the first and second areas.

Example 9, Cholesteric Device

A thin LCP layer was formed on a Corona treated PET substrate by Kbar coating (bar size 0) solution S-LCP2.

The film was dried at 61° C. for 30 s and then crosslinked at room temperature under nitrogen upon irradiation with 1500 mJ/cm$^2$ of a Hg-lamp. The dry film thickness was about 0.2 μm. It was observed that the optical axis of the anisotropic LCP layer was uniformly aligned in a preferred direction. The orientation of the liquid crystal material was induced by anisotropic surface properties of the PET substrate. The purpose of the thin LCP layer was to enhance the orientation forces for the cholesteric material to be coated on top.

A layer of a cholesteric PLCPO material was formed on top of the LCP2 layer by Kbar coating (bar size 2) solution S-cPLCPO, drying the film at 61° C. for 30 s and crosslinking it under nitrogen upon irradiation with 1500 mJ/cm$^2$ of a Hg-lamp. The dry film thickness was about 2.5 μm.

The left half of the cPLCPO layer was then exposed to LPUV light with a polarization plane at 0°, whereas the right half of the cPLCPO layer was exposed to LPUV light with a polarization plane at 45°. Both angles are measured with regard to the same reference edge of the substrate.

The exposed cPLCPO layer was then Kbar coated with S-LCP1 (bar size 1). The film was dried at 50° C. for 60 s and then crosslinked under nitrogen upon irradiation with 1500 mJ/cm$^2$ of a Hg-lamp.

When observing the resulting device in reflection with non-polarized white light, the typical properties of a cholesteric layer could be seen. Under observation along the normal direction to the layers it appeared in a red color, which turned into green, when observed at larger oblique angles.

By further analyzing the device with a linear polarizer between the observer and the device with the LCP1 layer facing the observer, it was found that the reflected light is linearly polarized with different planes of polarization in the above mentioned left and right half. It could be concluded that the optical axis of the LCP1 retarder was oriented at 0° in the left half of the device and at 45° in the right half of the device.

Example 10, Achromatic Retarder Using M-PLCPO2

In the same way as in example 2, a primer coated TAC substrate was coated with the photo-alignment solution S-PA1, dried and exposed to aligning light with the plane of polarization at 20° with regard to a reference edge on the TAC substrate.

On top of the exposed photo-alignment layer a layer was formed from the solution S-PLCPO2 by Kbar coating (bar size 2). The wet film was annealed and dried at 50° C. for 60 s and subsequently crosslinked at room temperature under nitrogen upon irradiation with 200 mJ/cm$^2$ of the light of a high pressure mercury lamp. The dry film thickness was 2.2 μm.

When the film was analyzed between crossed polarizers, it was found that the film was birefringent with an optical axis oriented at 20° with regard to the reference edge of the TAC film. An optical retardation of about 270 nm was measured with a tilting compensator.

The PLCPO layer was then exposed to collimated LPUV light (280-320 nm; 300 mJ/cm$^2$) with the polarization plane at 80° with regard to the above reference edge on the TAC substrate. After exposure to LPUV light, the film was analyzed again. It was found that the optical properties have not changed upon exposure. In particular, the film was uniaxially birefringent, without any twist, with an optical axis oriented at 20° with regard to the reference edge of the TAC film. An optical retardation was still about 270 nm.

Subsequently, LCP solution S-LCP1 was Kbar coated (bar size 1) on top of the PLCPO layer. The wet film was annealed and dried at 50° C. for 60 s and crosslinked at room temperature under nitrogen upon irradiation with 1500 mJ/cm$^2$ of the light of a high pressure mercury lamp.

The resulting film exhibited a homogeneous appearance without any visible defect. By analyzing the film by ellipsometry it was found that the film had the properties of an achromatic quarter wave plate. From the ellipsometric evaluation it was found that the LCP1 layer had an optical retardation of 130-140 nm.

Example 11, Achromatic Retarder Using M-PLCPO3

In the same way as in example 2, a primer coated TAC substrate was coated with the photo-alignment solution S-PA1, dried and exposed to aligning light with the plane of polarization at 20° with regard to a reference edge on the TAC substrate.

On top of the exposed photo-alignment layer a layer was formed from the solution S-PLCPO3 by Kbar coating (bar size 2). The wet film was annealed and dried at 50° C. for 60 s and subsequently crosslinked at room temperature under nitrogen upon irradiation with 200 mJ/cm$^2$ of the light of a high pressure mercury lamp. The dry film thickness was 2.2 µm.

When the film was analyzed between crossed polarizers, it was found that the film was birefringent with an optical axis oriented at 20° with regard to the reference edge of the TAC film. An optical retardation of about 270 nm was measured with a tilting compensator.

The PLCPO layer was then exposed to collimated LPUV light (280-320 nm; 300 mJ/cm$^2$) with the polarization plane at 80° with regard to the above reference edge on the TAC substrate After exposure to LPUV light, the film was analyzed again. It was found that the optical properties have not changed upon exposure. In particular, the film was uniaxially birefringent, without any twist, with an optical axis oriented at 20° with regard to the reference edge of the TAC film. An optical retardation was still about 270 nm.

Subsequently, LCP solution S-LCP1 was Kbar coated (bar size 1) on top of the PLCPO layer. The wet film was annealed and dried at 50° C. for 60 s and crosslinked at room temperature under nitrogen upon irradiation with 1500 mJ/cm$^2$ of the light of a high pressure mercury lamp.

The resulting film exhibited a homogeneous appearance without any visible defect. By analyzing the film by ellipsometry it was found that the film had the properties of an achromatic quarter wave plate. From the ellipsometric evaluation it was found that the LCP1 layer had an optical retardation of 130-140 nm.

The invention and different embodiments can be summarized by the following items:

1. Method for manufacturing an optical element (1, 2, 3, 4, 5, 6) including a layer comprising anisotropic optical function and alignment capability (23, 26, 27, 28) comprising the steps
   providing a composition comprising polymerizable liquid crystals and a photo-orientable substance (PLCPO material)
   forming a layer of the PLCPO material on a support (21)
   initiate polymerization of the polymerizable liquid crystals in the PLCPO layer (23, 26, 27, 28)
   exposing the PLCPO layer (23, 26, 27, 28) to aligning light to generate alignment on the upper surface of the layer for a slave material, such that the alignment direction at least in one area of the surface is different from the orientation of the liquid crystal director of the liquid crystals just beneath the upper surface of the layer in the at least one area.

2. Method according to item 1, further including a step of applying alignment treatment for the liquid crystal material of the PLCPO layer (23, 26, 27, 28).

3. Method according to item 1 or 2, wherein a reorientation of the liquid crystals in the PLCPO layer (23, 26, 27, 28) by the action of the aligning light is prevented.

4. Method according to any preceding item, wherein polymerization of the polymerizable liquid crystals is initiated before the PLCPO layer (23, 26, 27, 28) is exposed to aligning light.

5. Method according to any of items 1 to 3, wherein polymerization of the polymerizable liquid crystals is initiated after the PLCPO layer (23, 26, 27, 28) is exposed to aligning light.

6. Method according to any of items 1 to 3, wherein polymerization of the polymerizable liquid crystals and generation of alignment is achieved in a single step of exposure of the PLCPO layer (23, 26, 27, 28) to aligning light.

7. Method according to any preceding item, wherein the PLCPO material comprises more than one photo-orientable substance.

8. Method according to any preceding item, wherein the photo-orientable substance in the PLCPO has a density gradient, such that the concentration of photo-orientable substance is higher at the upper surface of the PLCPO layer than in the middle of the layer.

9. Method according to any preceding item, wherein the photo-orientable substance comprises fluorinated and/or siloxane moieties and/or is a polysiloxane.

10. Method according to any preceding item, wherein the PLCPO material comprises isotropic or anisotropic fluorescent and/or non-fluorescent dyes, dichroic dyes and/or chiral additives.

11. Layer structure (1, 2, 3, 4, 5, 6) comprising a PLCPO layer (23, 26, 27, 28), which has an optical anisotropic property and which has alignment capability on its surface, wherein at least in one area the alignment direction provided by the PLCPO layer is different from the liquid crystal orientation in the PLCPO layer just beneath the upper surface of the layer.

12. Layer structure according to item 11, wherein the photo-orientable substance in the PLCPO has a density gradient, such that the concentration of photo-orientable substance is higher at the upper surface of the PLCPO layer than in the middle of the layer.

13. Layer structure according to item 11 or 12, wherein the photo-orientable substance comprises fluorinated and/or siloxane moieties and/or is a polysiloxane.

14. Layer structure according to any of items 11 to 13, wherein the PLCPO material comprises isotropic or anisotropic fluorescent and/or non-fluorescent dyes, dichroic dyes and/or chiral additives.

15. Layer structure according to any of items 11 to 14, wherein the alignment provided by the PLCPO layer has locally different orientation.

16. Layer structure according to any of items 11 to 15, which has an additional anisotropic layer in direct contact with the PLCPO layer, the additional layer comprising liquid crystal polymers (25, 26, 27, 28), wherein the liquid crystal polymer of the additional layer is aligned according to the alignment information of the PLCPO layer.

17. Layer structure according to item 16, wherein the PLCPO layer and the additional anisotropic layer are configured such that the layer structure acts as an achromatic retarder.

18. Optical device comprising a reflective polarizer and an achromatic retarder according to item 17.

19. Use of a layer structure according to any of items 11 to 17 for light management in liquid crystal or OLED displays.

20. Composition comprising polymerizable liquid crystals and a photo-orientable substance, wherein the percentage by weight of photo-orientable substances is less than 5%, less than 1 wt % or even less than 0.1 wt % and the photo-orientable substance comprises fluorinated and/or siloxane moieties and/or is a polysiloxane, 21. Composition according to item 20, wherein the photo-orientable substance is a polymer and comprises fluorinated moieties in the side chain.

The invention claimed is:

1. A method for manufacturing an optical element comprising:
    providing a composition comprising polymerizable liquid crystals and a photo-orientable substance (PLCPO material);
    forming a layer of the PLCPO material on a support;
    initiating polymerization of the polymerizable liquid crystals in the PLCPO layer; and
    exposing the PLCPO layer to aligning light to generate alignment on the upper surface of the layer for a slave material, such that the alignment direction at least in one area of the surface is different from the orientation of the liquid crystal director of the liquid crystals just beneath the upper surface of the layer in the at least one area.

2. The method according to claim 1, further including a step of applying alignment treatment for the liquid crystal material of the PLCPO layer.

3. The method according to claim 1, wherein a reorientation of the liquid crystals in the PLCPO layer by the action of the aligning light is prevented.

4. The method according to claim 1, wherein polymerization of the polymerizable liquid crystals is initiated before the PLCPO layer is exposed to aligning light.

5. The method according to claim 1, wherein polymerization of the polymerizable liquid crystals is initiated after the PLCPO layer is exposed to aligning light.

6. The method according to claim 1, wherein polymerization of the polymerizable liquid crystals and generation of alignment is achieved in a single step of exposure of the PLCPO layer to aligning light.

7. The method according to claim 1, wherein the PLCPO material comprises more than one photo-orientable substance.

8. The method according to claim 1, wherein the photo-orientable substance in the PLCPO has a density gradient, such that the concentration of photo-orientable substance is higher at the upper surface of the PLCPO layer than in the middle of the layer.

9. The method according to claim 1, wherein the photo-orientable substance comprises fluorinated and/or siloxane moieties and/or is a polysiloxane.

10. The method according to claim 1, wherein the PLCPO material comprises isotropic or anisotropic fluorescent and/or non-fluorescent dyes, dichroic dyes and/or chiral additives.

\* \* \* \* \*